(12) United States Patent
Dabich, II et al.

(10) Patent No.: US 7,346,250 B1
(45) Date of Patent: Mar. 18, 2008

(54) PREFERENTIAL ETCHING METHOD OF FORMING MICROSTRUCTURE FOR AN OPTICAL WAVEGUIDE

(75) Inventors: Leonard Charles Dabich, II, Painted Post, NY (US); Michael Thomas Gallagher, Corning, NY (US); Daniel Warren Hawtof, Corning, NY (US); Brett Jason Hoover, Middlebury Center, PA (US); Karl William Koch, III, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/731,633

(22) Filed: Mar. 30, 2007

(51) Int. Cl.
*G02B 6/04* (2006.01)
*G02B 6/02* (2006.01)

(52) U.S. Cl. ...................... 385/125; 385/115
(58) Field of Classification Search ............... None
See application file for complete search history.

(56) References Cited

U.S. PATENT DOCUMENTS

| | | | |
|---|---|---|---|
| 6,444,133 B1 | 9/2002 | Fajardo et al. ............ 216/24 |
| 6,996,315 B2 * | 2/2006 | Henze et al. ............ 385/115 |
| 2006/0153512 A1 * | 7/2006 | Falkenstein et al. ....... 385/125 |
| 2006/0177187 A1 | 8/2006 | Williams et al. ........... 385/123 |
| 2006/0257083 A1 * | 11/2006 | Rasmussen ................ 385/115 |

FOREIGN PATENT DOCUMENTS

WO   03/004425   1/2003

* cited by examiner

Primary Examiner—Tina M. Wong
(74) Attorney, Agent, or Firm—Svetlana Z. Short

(57) ABSTRACT

A method of fabricating a microstructure for an optical waveguide such as a photonic bandgap fiber is provided. The method includes the steps of assembling a stack of capillary tubes having substantially identical dimensions, fusing and redrawing the stack into a preform having a plurality of parallel holes of equal diameter, selecting a pattern of the holes for etching in order to increase their diameter, and plugging the unselected holes at one end of the preform against the flow of a pressurized etching fluid. Such plugging of the unselected holes is accomplished applying a layer of a gel-like sealant over the end of the preform, and then pushing the sealant into the holes to form sealant plugs in all of the holes. The sealant plugs are then removed from the selected holes by punching the sealant plugs out of the selected holes. The selected holes are then etched by conducting a pressurized flow of etching fluid to the end of the preform such that etching fluid flows only through the pattern of selected holes. The resulting preform is then fused and drawn into an optical waveguide, where the pattern of etched and unetched holes may form, for example, the microstructure for a photonic bandgap optical fiber.

20 Claims, 7 Drawing Sheets

PREFERENTIAL ETCHING METHOD OF FORMING MICROSTRUCTURE FOR AN OPTICAL WAVEGUIDE

FIELD OF THE INVENTION

This invention generally relates to a method of forming a microstructure for an optical waveguide, such as a photonic bandgap fiber, and is specifically concerned with a method for selectively etching a selected pattern of holes in a preform that allows a variety of different microstructures to be fabricated out of a same type of preform.

BACKGROUND OF THE INVENTION

Microstructured optical fiber waveguides are well known in the prior art. Of all such microstructured fibers, photonic bandgap fibers are among the most important due to their ability to transmit optical signals with very low losses and with very low non-linearity. Unlike conventional optical fibers having a core formed from a higher index glass that is surrounded by a cladding of lower index glass, and which rely exclusively on total internal reflection (TIR) to conduct a beam of light, microstructured optical fibers typically have a hollow core surrounded by a pattern of alternating low and high index materials that conducts light by imposing a "forbidden zone" on a range of optical wavelengths that cannot propagate through the microstructure surrounding the hollow core. The pattern of alternating low and high index materials may take the form of a pattern of holes in the glass surrounding the core, but may also be (in the case of Bragg type fibers) alternating concentric rings of high and low index materials that surround the core. When a beam of light is introduced into the hollow core of a fiber having such a microstructure, light having a wavelength within the "forbidden zone" is trapped within the core and conducted through the fiber, while light having a wavelength outside the "forbidden zone" propagates through the microstructure and out of the sides of the fiber. Because the optical signal conducted through the hollow core of a photonic bandgap fiber (which is typically air filled) incurs much less absorption and Rayleigh scattering and practically none of the nonlinearities imposed by the glass cores of more conventional fibers, there is currently a great deal of interest in the economical manufacture of such fibers.

In addition to photonic bandgap fibers, there is interest in other types of microstructured fiber waveguides as well. For example, microstructured optical fibers having a solid glass core and a plurality of holes disposed in the cladding region around the core have been constructed. The arrangement, spacings and sizes of the holes may be designed to yield microstructured optical fibers with dispersions ranging anywhere from large negative values to large positive values. Such fibers may be useful, for example, in dispersion compensation. Solid-core microstructured optical fibers may also be designed to be single mode over a wide range of wavelengths. Solid-core microstructured optical fibers generally guide light by a total internal reflection mechanism; the low index of the holes can be thought of as lowering the effective index of the cladding region in which they are disposed.

Microstructured optical fibers are fabricated using methods roughly analogous to the manufacture of all-glass optical fiber. A structured preform having the desired arrangement of holes is formed, and then drawn into fiber using heat and tension. In the stack and draw method of making a microstructured optical fiber preform, hollow glass tubes which are typically hexagonal-sided are stacked together to form an assembly having the desired lattice structure, and one or more of the tubes are removed to form a core volume in the center of the lattice structure. The lattice structure is fused and redrawn to reduce its cross-sectional size, then sleeved and drawn into optical fiber having a lattice-like array of holes surrounding a core defect void. Preforms made according to the stack and draw process are categorized as either close packed arrays or non-close packed arrays. A close-packed array is an array of capillary tubes where the capillary tubes are mutually contiguous. A non-close packed array is an array of capillary tubes where jigs or spacers are placed between the capillary tubes to space the walls of the tubes apart a desired distance.

Unfortunately, there are a number of undesirable limitations associated with such conventional methods of forming a microstructure. For example, because the core volume is formed by the removal of one or more tubes from the assembly, it has a shape and size restricted to integer multiples of the shape of the hexagonal-sided tubes of the assembly. Additionally, every particular microstructure pattern (i.e. those having different void spaces and different pitches of air holes, those having multiple hollow cores, and those having solid cores of different pitches and patterns) requires a custom-made preform that in turn requires a particular custom-stacking of hollow glass tubes. In some instances, the desired microstructure cannot be obtained by a simple, close-packed array of identically-dimensioned capillary tubes having hexagonal outer walls that interfit and mutually support one another. Instead, a non-close-packed array of capillary tubes is required wherein specially sized spacers or jigs are placed in the array to space the walls of the capillary tubes apart a desired distance. Finally, there are a number of potentially useful microstructure designs that are difficult if not impossible to produce by such conventional methods, such as a microstructure wherein every other hole has a different diameter. While etching techniques are known which are capable of creating microstructures having different void-filling fractions in a same type of preform, such techniques only partially overcome the aforementioned limitations as the etchant must be conducted through all the holes in the preform simultaneously, thereby increasing the diameter of all the holes the same amount.

Clearly, there is a need for a new manufacturing method that does not require the custom manufacture of a particular preform for every different microstructure design. Ideally, such a method would allow a broad range of different microstructure patterns to be manufactured from a single, standard easily manufactured preform in order to expedite the manufacturing process. Finally, it would be desirable if such a method allowed the manufacture of microstructure patterns that were either impractical or impossible to manufacture by conventional manufacturing techniques.

SUMMARY OF THE INVENTION

Generally speaking, the invention is a method of fabricating an optical waveguide such as a photonic bandgap fiber that overcomes the aforementioned shortcomings associated with the prior art. To this end, the method of the invention comprises the steps of assembling a stack of capillary tubes, fusing and redrawing the stack into a preform having a plurality of parallel holes, selecting a pattern of the holes for etching, plugging the unselected holes at preferably both ends of the preform, and etching the pattern of selected holes by conducting a pressurized flow of etching fluid to the end of the preform such that etching fluid flows only through the pattern of selected holes. The resulting preform is then drawn into an optical waveguide, where the pattern of etched and unetched holes may form, for example, the microstructure for a photonic bandgap optical fiber.

The step of providing etchant plugs in only the unselected holes is conducted in three stages. First, a layer of a gel-like sealant compound is applied over the end of the preform in order to cover all of the holes. This may be implemented by wrapping tape or other adhesive sheet material around the end of the preform such that an edge of the tape extends 3-4 mm past the end of the preform. Sealant compound is then applied in the recess defined by the end surface of the preform and the inner surface of the extending edge of the tape. Second, the gel-like layer of sealant is pushed into the end of the preform by placing a flat object over the top edge of the extending tape and pushing down to create sealant plugs in all the holes. Excess sealant is removed and the sealant pushed into all of the holes is allowed to dry in order form a sealant plug in each hole. Third, the sealant plugs in the holes selected for etching are punched out with the prongs of a mechanical tool, thereby providing a preform with selected, unplugged holes and holes that are plugged with a sealant against the flow of an etchant. In the preferred method, this plugging procedure is applied to both ends of the preform so that the unselected holes are plugged on both ends, which in turn prevents any of the etching fluid from entering either end of the unselected holes.

The resulting preform is next installed in an etchant circulator having a nozzle that conducts a pressurized flow of etching agent through the selected, unplugged holes until the diameter of these holes is enlarged to a desired diameter. The ends of the preform are cut to remove all of the plugged portions of the holes. The completed preform is then drawn into an optical fiber.

The sealant may be a silicone based glass sealant such as Dow Corning's RTV Sealant, and the etchant may be a liquid fluorine compound such as ammonium bi-fluoride or hydrofluoric acid, or a gaseous fluorine compound such as hydrogen fluoride.

The method advantageously allows a broad range of microstructures having virtually any combination of different hole diameters to be rapidly manufactured from a single type of preform easily manufactured from a bundle of capillary tubes all having the same dimensions, and having a uniform distribution of holes all having the same diameter. While the method of the invention is particularly useful in the manufacture of photonic bandgap optical fibers having one or more hollow light conducting cores, it is applicable to the manufacture of virtually any type of optical waveguide having a microstructure, including waveguides that operate by total internal reflection.

DETAILED DESCRIPTION OF THE PREFERRED EMBODIMENT

Figure 1A:
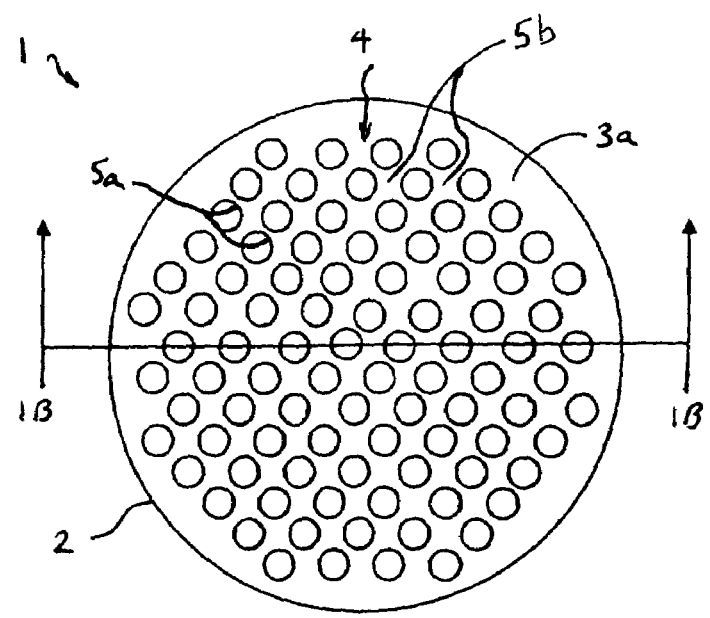
FIGS. 1A and 1B are an end view and a cross-sectional side view of a standardized preform to which the method of the invention is advantageously applicable.
Figure 1B:
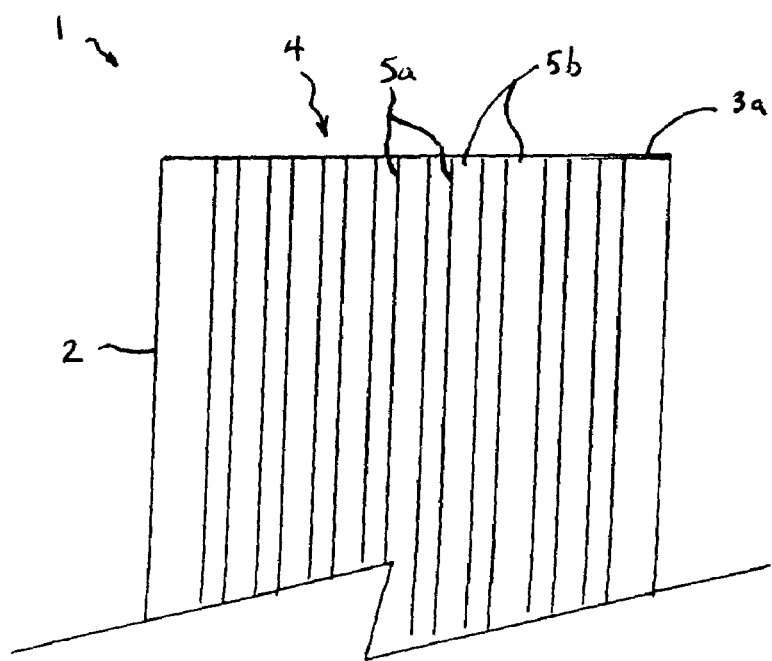

With reference to FIGS. 1A and 1B, wherein like numbers designate like components through all the several figures, the method of the invention is preferably applied to a standardized glass preform 1 having a cylindrical body 2, and flat ends 3a, 3b. The preform 1 has a lattice 4 formed from a plurality of holes 5a having a same diameter which are uniformly spaced apart at a same pitch (which is defined as the distance between the centers of the holes). Such a preform 1 is preferred due to its ease of manufacture by the stacking and drawing of identically-dimensioned hexagonal-sided capillary tubes, and the fact that the uniform pattern of same-diameter holes 5a can be easily converted, via selective etching, into a broad range of different lattice designs. The diameter of the preform 1 may be as small as 4 mm or as large as 400 mm, although a diameter larger than 10 mm is preferred as it facilitates the implementation of the method by providing a lattice 4 of larger dimensions. A typical diameter would be 12 to 20 mm. Because preform diameter should be roughly 40% of the fiber draw furnace diameter (before sleeving into an overclad tube which increases the preform diameter to up to 99% of the draw furnace diameter) the fiber draw furnace should be selected so as to accommodate a 10 mm preform diameter or greater. As will be described hereinafter, the holes 5a and the glass 5b between the holes 5a ultimately form the low index and high index components of a microstructure which may, for example, prohibit the transmission of light having a certain range of wavelength if the preform is drawn into a photonic bandgap fiber. When using a liquid etchant, a hole diameter prior to etching of between 100 and 500 micrometers is preferred. Smaller hole diameters may be used with gaseous etchants. One can use a smaller preform diameter with larger holes. For a fixed number of holes one can scale the preform diameter up, which will increase the hole size, simplifying access to the holes and enabling implementation of this method.

Figure 2A:
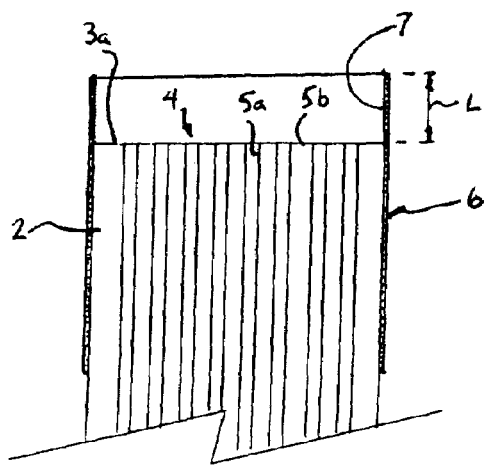
FIGS. 2A-2C illustrate the application of the initial steps of the method of the invention to the preform illustrated in FIGS. 1A and 1B, wherein all of the holes of the microstructure are plugged with a sealant.
Figure 2B:
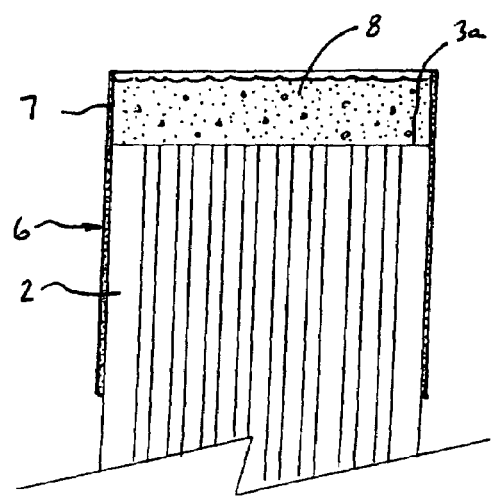
Figure 2C:
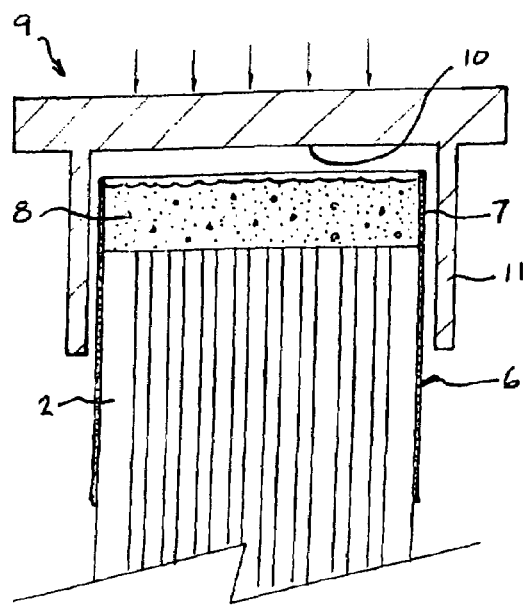
Figure 2D:
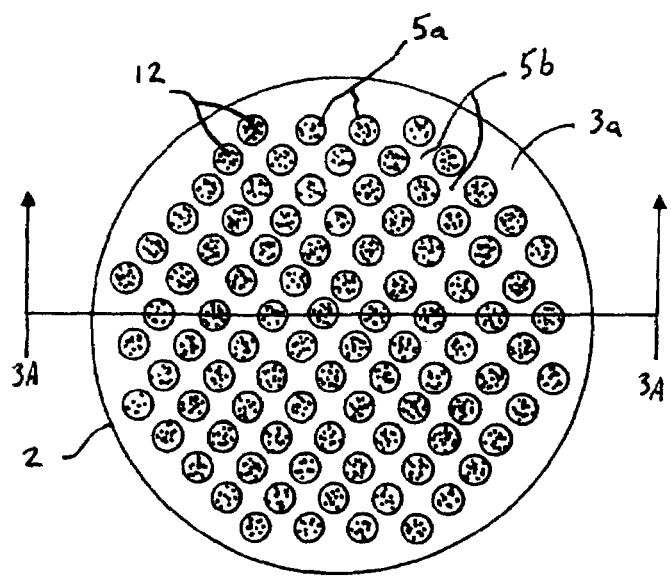
FIG. 2D is an end view of the plugged preform that results from the method steps illustrated in FIGS. 2A-2C.

FIGS. 2A-2D illustrate the initial plugging steps of the method. While these steps are illustrated with respect to only one end 3a of the preform 1, it should be noted that these steps are in fact carried out on both ends 3a, 3b of the preform in the preferred implementation of the method. First, as is illustrated in FIG. 2A, a strip of tape 6 or other self-adhesive sheet material is wrapped around the ends 3a, 3b of the preform 1 such that the outer edge 7 extends above the flat ends 3a, 3b. While the length L of this extending outer edge 7 may vary, it is approximately 5 mm in this example. Next, the cup-shaped recess defined by the flat ends 3a, 3b of the preform and the inner surface of the extending outer edge 7 of the tape 6 is filled with a gel-like, silicone glass sealant such as Dow Corning's RTV Sealant (Part #732) in order to form a layer 8 of sealant over the ends 3a, 3b. Finally, a compressor member 9 having a flat inner wall 10 and an annular outer wall 11 is pressed over either end 3a, 3b of the preform 1 to squeeze the sealant layer 8 into all of the holes 5a of the lattice 4 for a distance of preferably between 3 and 5 mm. Excess sealant is then wiped off of the ends 3a, 3b of the preform, and the sealant is allowed to dry in the holes 5a. Drying may take 10-12 hours. Other sealants may require different drying times. Non-silicone based sealants may also be employed that harden faster, such as epoxies that can be cured by through-heating or exposure to ultraviolet radiation, so long as they reliably seal the holes and are resistant to the fluorine-based compounds used in the etching step. The end result of these initial plugging steps is that a sealant plug 12 between about 3 and 5 mm in length is formed in each one of the holes 5a, as is illustrated in FIG. 2D.

Figure 3A:
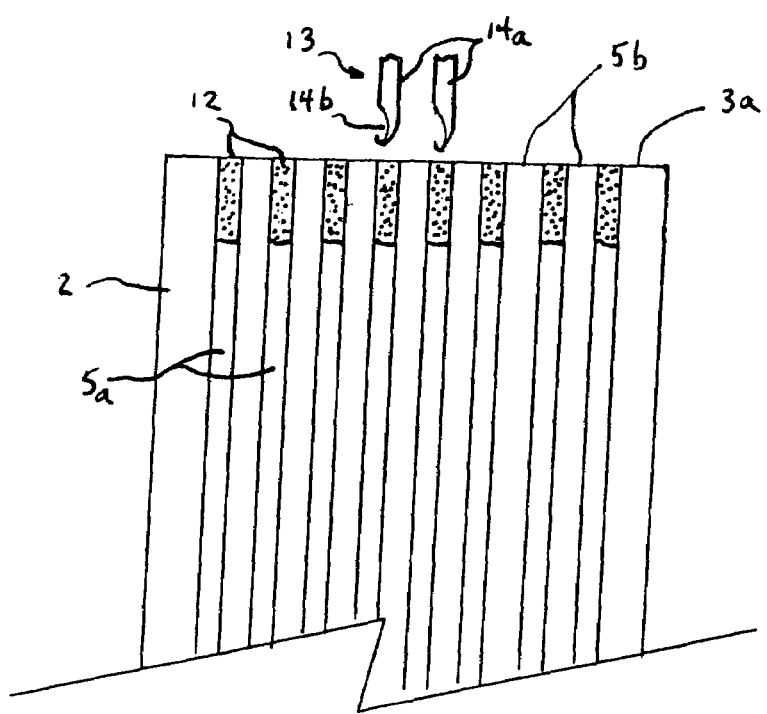
FIG. 3A illustrates the next step of the method wherein the sealant plugs are removed from selected holes in the plugged preform illustrated in FIG. 2D.
Figure 3B:
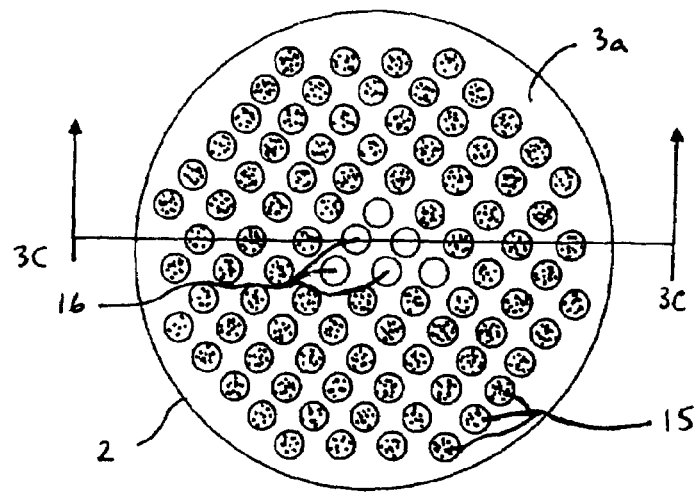
FIGS. 3B and 3C are an end view and a cross-sectional side view of the selectively unplugged preform that results from the step of the method illustrated in FIG. 3A.
Figure 3C:
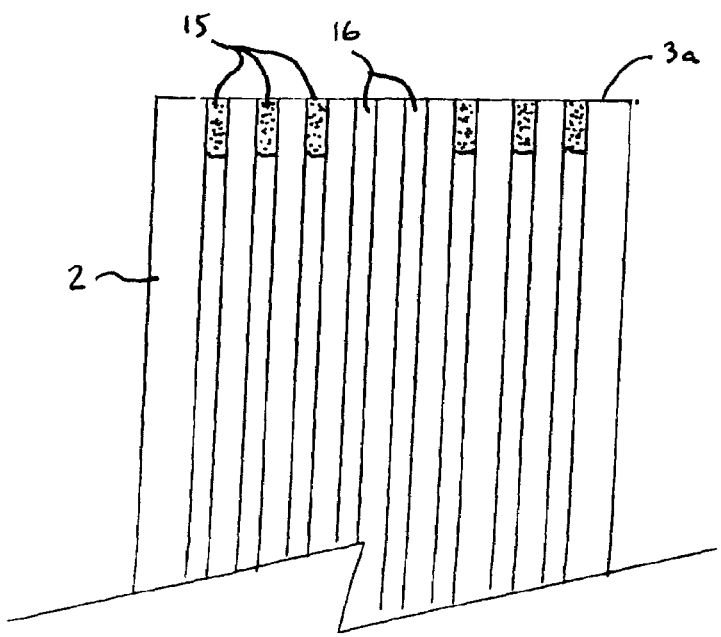

FIGS. 3A-3C illustrate the steps of the method where the plugs in the holes 5a selected for etching are removed. As illustrated in FIG. 3A, a mechanical punching tool 13 is used to punch out the plugs 12 in the holes selected for etching. The tool 13 may have one or more prongs 14a with barbed ends 14b arranged in a template-like pattern that corresponds to the particular holes 5a to be etched so that the punching step may be carried out via a single reciprocation of the tool 13. Such barbed ends 14b are preferable as they tend to more clearly remove the sealant plugs 12 from the plugged holes 15. Alternatively, the tool 13 may have only a single prong 14a that unplugs each selected hole via an individual reciprocation. The punching step may be carried out manually or may be automated, and may use non-mechanical punching tools, such as laser ablation or vacuum suction. In the present example, the selected holes 16 are the center six holes of the lattice 4 which will be expanded via the etching step into defect which will ultimately form the hollow core of a photonic crystal fiber. FIGS. 3B and 3C illustrate the result of the punching step. Again, while these steps have been described with respect to only one end 3a of the preform, they are applied to both ends 3a, 3b of the preform in the preferred implementation of the method to provide a clear flow path for the etchant in each of the selected, unplugged holes 16. At the end of these steps, the preform 1 has both plugged holes 15 and unplugged holes 16.

Figure 4:
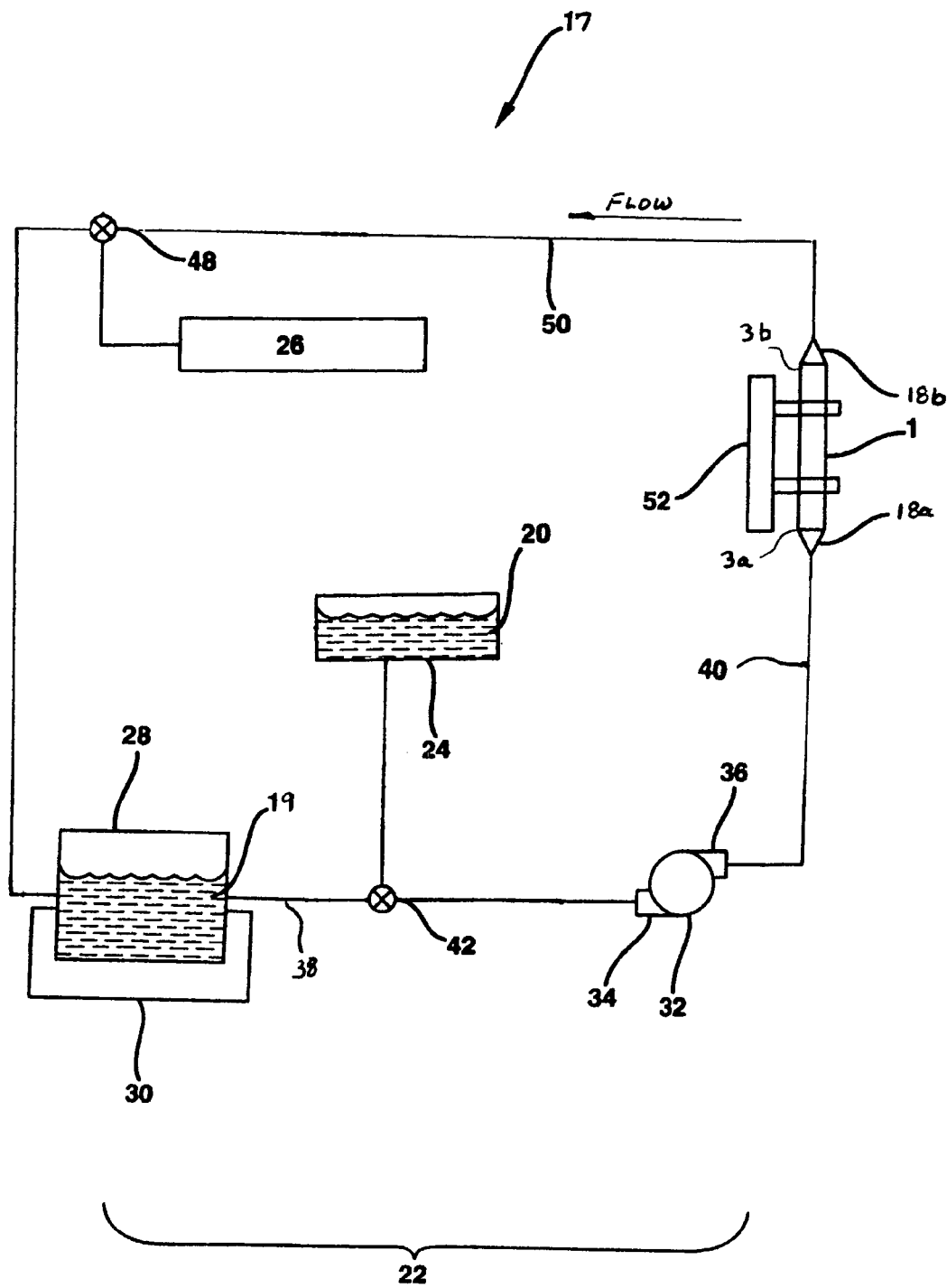
FIG. 4 is a schematic view of an etchant circulator useful in implementing the etching step of the method.

FIG. 4 illustrates the etching step of the method. In this step, the punched preform 1 is installed between a pair of opposing nozzles 18a, 18b in an etchant circulator 17. Preferably the preform 1 is secured in near vertical position throughout the etching process by a support 52. The bottom nozzle 18a conducts a pressurized flow of etching agent 19 to both the plugged holes 15 and unplugged holes 16 at the end 3a of the preform 1, while the top nozzle 18b collects the etching agent conducted through the unplugged holes 16 for recirculation. The nozzles 18a and 18b engage the preform 1 in such a manner as to preclude the etching agent 19 from acting on the external surface of the preform 1.

The etching circulator 17 includes a substantially closed loop delivery circuit 22 for passing the etching agent 19 through the unplugged holes 16 of the preform 1. The etchant circulator 17 also includes delivery and recovery systems 24, 26 for a flushing agent 20 to remove residual etching agent 19 after the etching of the unplugged holes 16 of the preform 1 is completed. An example of a typical flushing agent 20 is water.

The etchant circulator 17 includes a reservoir 28 for holding the etching agent 19. In this embodiment, the etching agent 19 is chosen to remove material from the unplugged holes 16 of the preform 1 in an efficient and predictable manner. Typically the etching agent 19 is a fluorine-based acid. Examples of acids suitable for use with a preform 1 made of silica glass include hydrofluoric acid and ammonium bi-fluoride. The etching agent 19 selected for use with a particular preform 1 depends on chemical composition of the preform 1 to be etched. Those of ordinary skill in the art of etching glass may readily select a particular etching agent 19 for a preform 1 having a specific glass composition.

The reservoir 28 may be a commercially available reservoir for handling corrosive materials. Such reservoirs are commercially available. An example of such a reservoir 28 is a chemically-resistant container available from the Nalgene Corporation located in Rochester, N.Y.

The reservoir 28 is thermally coupled to a heater 30. The heater 30 thermally stabilizes the etching agent 19 at a preselected temperature. The heater 30 may be, for example, a heat sink bath that surrounds a portion of the reservoir 28. Such heat sink baths may be assembled from commercially available components. Examples of commercially available components that may be combined to form a heat sink bath are a CT 050 pump marketed by Schott Gerate and a GP-100 bath temperature controller available from Neslab Instruments, Portsmouth, N.H. In one embodiment when ammonium bi-fluoride is used as the etching agent 19 and the preform 1 is made from silica glass the heater 30 maintains the etching agent 19 at a temperature of about 58.degree. C.

The etchant circulator 17 further includes a pump 32. The pump 32 includes an intake port 34 and an output port 36. The input port 34 is connected to the reservoir 28 by an input line 38. The pump 32 draws etching agent 19 from the reservoir 28 through the input line 38. Preferably the input line 38 is made of a material resistant to the corrosive effects of the etching agent 19. Etching agent 19 entering the intake port 34 exits the pump 32 through an output port 36. The pump 32 increases the dynamic pressure of the etching agent 19 so that the etching agent 19 may be circulated through the delivery circuit 22. The output port 36 of the pump 32 is connected to a delivery line 40. The other terminus of the delivery line 40 is connected to a valve 42.

The valve 42 is configured to regulate the flow of etching agent 19 through the perform 1. Preferably the delivery system 36 for the flushing agent 20 is also connected to the valve 42 and the valve 42 is configured to have at least three settings. The first setting directs etching agent 19 coming from the pump 32 to nozzle 18a. The second setting directs flushing agent 20 to the nozzle 18a and the third setting blocks both etching agent 19 and flushing agent 20 from entering the nozzle 18a.

A receptacle 26 is connected to the other end of the preform 1. The receptacle 26 is configured to collect flushing agent 20 through directional valve 48. The directional valve 48 has at least two settings. When the etching agent 19 is flowing through the preform 1, the directional valve 48 is configured to direct the etching agent 19 into a return line 50. The etching agent 19 flows through the return line 50 and is reintroduced into the reservoir 28. When the receptacle 26 is collecting flushing agent 20 the directional valve 48 is configured to direct the flushing agent 20 into the receptacle 26.

The period of time that the etching agent 19 circulates through the preform 1 is determined by the pre-etch dimensions of the holes 5 and the desired post-etching diameter of the holes. The relationship between hole diameter and etching time is known in the art and explained in detail in U.S. Pat. No. 6,444,133 assigned to Corning, Inc., the entire specification of which is expressly incorporated herein by reference. In the present example, a flow of etching agent 19 is conducted through the six center, unplugged holes 16 for a sufficient amount of time to expand their diameters until the resulting holes overlap one another and create a centrally located hollow core 59 that will be capable of conducting light having a wavelength corresponding to the "forbidden zone" of the surrounding lattice 4 after the preform is drawn into an optical fiber.

Figure 5A:
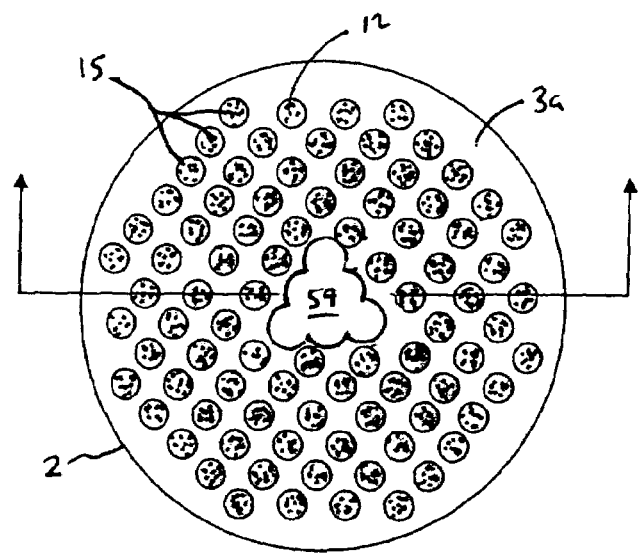
FIG. 5A is an end view of the etched preform that results from the etching step.
Figure 5B:
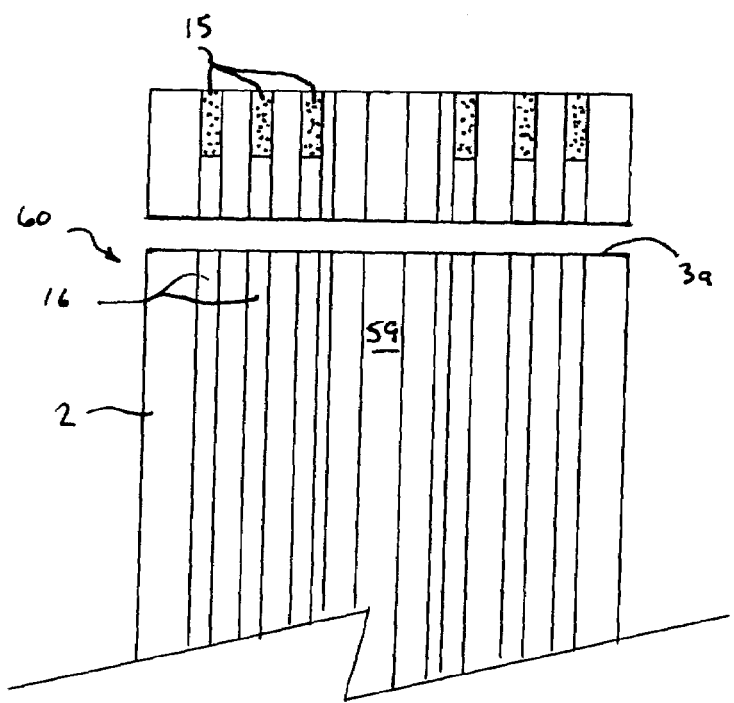
FIG. 5B is a cross-sectional side view of the preform illustrated in FIG. 5A illustrating how the end of the preform is removed to produce the completed preform.

FIGS. 5A and 5B illustrate the last steps of the method. After the preform 1 is removed from the etchant circulator 17, the sealant plugs 12 must be removed from all of the plugged holes 15. The easiest way to accomplish this is to merely cut off the ends of the preform 1, as is indicated in FIG. 5B. This avoids the tedious and time consuming task of punching out all of the plugs 12 from the plugged holes 15. The completed preform 60 is then drawn in an optical fiber which, in the instant case, would be a photonic bandgap fiber.

Figure 6A:
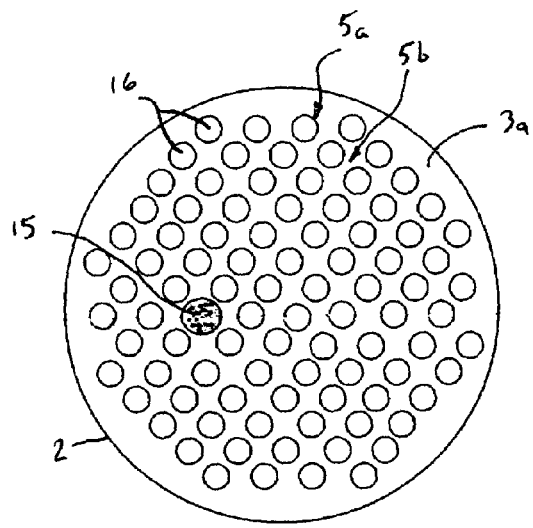
FIGS. 6A and 6B illustrate how the method of the invention may be used to adjust the diameters of all the holes in the preform to the same diameter when the initial preform has a single, anomalously large hole.
Figure 6B:
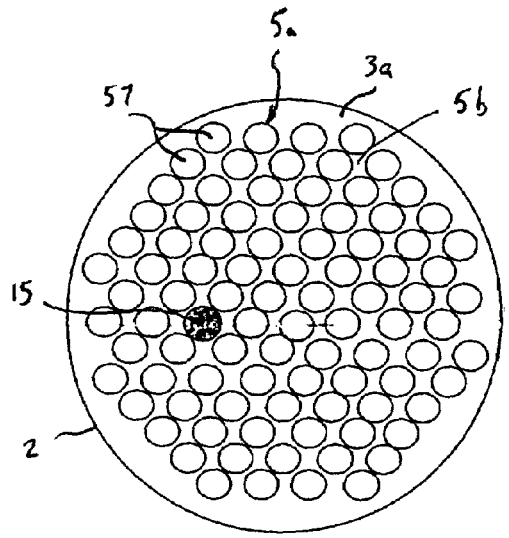

FIGS. 6A and 6B illustrate how the method of the invention may be used to size all of the holes 5 into holes having the same diameter when the preform includes an anomalously large hole. This is accomplished by plugging the single large hole 15 and leaving the remaining holes 16 unplugged. Etching agent 19 is then conducted through the unplugged holes 16 in the manner previously described to produce holes 57 (shown in FIG. 6B) that are the same diameter as the anomalously large hole 15. The plug in the single plugged hole 15 is then punched out using a pronged tool 13 as previously described.

Figure 7A:
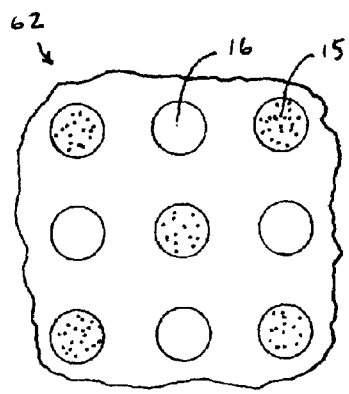
FIGS. 7A and 7B illustrate how the method may be used to easily create a complex preform microstructure where every other hole has an enlarged diameter.
Figure 7B:
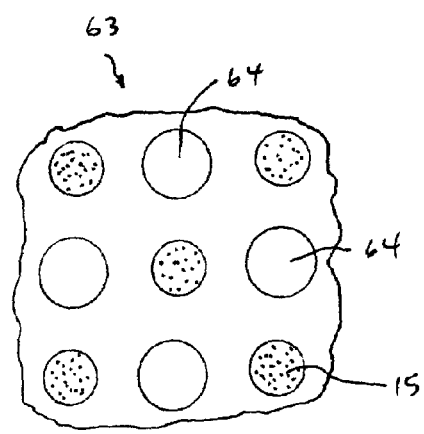

FIGS. 7A and 7B illustrate how the method of the invention may be used to produce preforms having relatively complex microstructures 63 from simple microstructures 62. Here, every other hole 15 is plugged, leaving every other hole 16 unplugged. Etching agent 19 is then conducted through the unplugged holes 16 in the manner previously described to produce a microstructure 63 in which every other hole 64 has a larger diameter than the plugged holes 15. The plugged holes are removed from the preform in the manner previously described.

Figure 8:
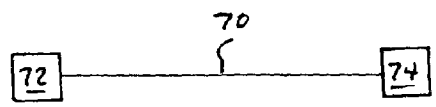
FIG. 8 illustrates a fiber that has been manufactured in accordance with the invention in use in an optical network.

Finally, FIG. 8 illustrates a photonic bandgap fiber 70 made via the method of the invention, transmitting an optical signal from a transmitter 72 to a receiver 74 of an optical network.

While this invention has been described with respect to a number of specific examples, many variations, modifications and additions to this invention will become apparent to persons of skill in the art. For example, one could place sealant only in the unselected holes and leave the holes to be etched free of sealant. This might be done when there are only a few, contiguous selected holes to be etched by "masking" the contiguous holes with a small piece of sheet material against the incursion of sealant, and then removing the piece of sheet material at the end of the sealant plugging step illustrated in FIG. 2D, thereby obviating the need for the hole-punching step illustrated in FIG. 3A. Such a variation of the method would be enabled by preform hole diameters larger than 200 micrometers, and even more enabled by preform hole diameters larger than 500 micrometers. Additionally, the selective plugging steps and the etching step may be repeated on a preform in order to create microstructures with holes having three or more different dimensions. All such variations, modifications and additions are intended to be encompassed within the invention, which is limited only by the appended claims and equivalents thereto.

We claim:

1. A method of fabricating an optical waveguide having a microstructure, comprising the steps of:
    assembling a stack of capillary tubes;
    fusing and redrawing said stack into a preform having a plurality of parallel holes;
    selecting at least one of said holes for etching with a flow of etching fluid;
    plugging at least one unselected hole against a flow of etching fluid, and
    etching said at least one selected hole by exposing said one end of said preform to a flow of etching fluid such that said flow of etching fluid enters only said at least one selected hole.

2. The method defined in claim 1, wherein said plugging is implemented by the application of a layer of sealant compound over the holes at both ends of the preform, and wherein the sealant is removed from said at least one selected hole prior to said etching step to admit said flow of etching fluid.

3. The method defined in claim 2, wherein said sealant compound is removed from said at least one selected hole by punching.

4. The method defined in claim 1, wherein said stack of capillary tubes are all of a uniform diameter such that the parallel holes in the resulting preform are substantially of the same diameter, and wherein the at least one selected hole to be etched is selected in accordance with a pattern that defines a selected microstructure.

5. The method defined in claim 1, wherein said capillary tubes include silica, and said flow of etching fluid is a pressurized flow of liquid etchant.

6. The method defined in claim 2, wherein said sealant compound is a silicone compound.

7. The method defined in claim 4, wherein an amount of enlargement of the diameter of the at least one selected hole is controlled by controlling the amount of time that the liquid etchant flows through the at least one selected hole.

8. The method defined in claim 1, wherein said stack of capillary tubes are not all of a uniform diameter such that at least one of the parallel holes in the resulting preform has a smaller diameter than other parallel holes, and wherein liquid etchant is directed into the at least one smaller diameter hole to enlarge its diameter to that of said other holes.

9. The method defined in claim 1, wherein the preform is over 8 mm in diameter, and wherein the diameter of the holes is at least 150 microns.

10. The method defined in claim 1, wherein all of said plugged and selected, unplugged holes at one end of said preform are exposed to said flow of etching fluid.

11. A method of fabricating an optical fiber having a microstructure, comprising the steps of:
    assembling a stack of substantially identical capillary tubes;
    fusing and redrawing said stack into a preform having a plurality of substantially identical parallel holes;
    etching at least one selected hole in said preform to enlarge the diameter thereof by plugging at least one unselected hole against a flow of an etching fluid, and exposing both plugged and unplugged holes to said flow such that said flow of etching fluid enters only said at least one selected hole, and drawing said etched preform to form an optical fiber having a microstructure that includes holes of different diameters.

12. The method defined in claim 11, wherein said at least one plugged hole is formed by the application of a layer of sealant compound over both ends of said preform to plug a plurality of the holes, and said at least one unplugged hole is formed by the removal of a sealant plug from said at least one selected hole to admit said flow of etching fluid.

13. The method defined in claim 12, wherein said at least one plugged hole is formed by applying pressure over said layer of sealant compound to push sealant into all of the holes at said one end, thereby forming sealant plugs in each of said holes.

14. The method defined in claim 13, wherein said layer of sealant compound is formed over said end of said preform by providing a sealant retaining wall around said one end, and then filling at least a portion of the space defined between the preform end and the inner surface of the retaining wall with sealant.

15. The method defined in claim 12, wherein said sealant plug is removed from said at least one selected hole by punching through the sealant plugging said hole, and wherein said at least one selected hole to be etched is selected in accordance with a pattern that defines a selected microstructure.

16. The method defined in claim 12, wherein an amount of enlargement of the diameter of the at least one selected hole is controlled by controlling the amount of time that the etching fluid flows through the at least one selected hole.

17. The method defined in claim 1, wherein said capillary tubes include silica, and said flow of etching fluid is a pressurized flow of liquid etchant that includes a fluorine compound.

18. The method defined in claim 11, further including the step of plugging at least one unselected hole against a flow of an etching fluid at a second end of said perform in a same pattern as the plugging of said at least one unselected hole at one end of said preform and exposing both plugged and unplugged holes at both of said ends to said flow such that said flow of etching fluid enters only said at least one selected hole.

19. An optical fiber having a microstructure formed by the steps of:
assembling a stack of substantially identical capillary tubes;
fusing and redrawing said stack into a preform having a plurality of substantially identical parallel holes;
etching a pattern of selected holes in said preform to enlarge the diameter thereof by plugging all unselected holes against a flow of an etching fluid at both ends of said preform, and connecting both plugged and unplugged holes at one end of said preform to said flow such that said flow of etching fluid enters only said at least one selected hole, and
drawing said etched preform to form an optical fiber having a microstructure that includes holes of different diameters.

20. The optical fiber defined in claim 19, wherein said etching step includes the steps of plugging all of said holes, unplugging said selected holes, and exposing all of said holes to said flow of etchant such that only said selected holes are etched.

* * * * *